United States Patent
Hoffman et al.

(10) Patent No.: US 9,131,643 B2
(45) Date of Patent: Sep. 15, 2015

(54) CORD WRAP SYSTEM AND PORTABLE BLOWER INCORPORATING SAME

(75) Inventors: Michael J. Hoffman, Apple Valley, MN (US); Chadwick A. Shaffer, Oakdale, MN (US)

(73) Assignee: The Toro Company, Bloomington, MN (US)

(*) Notice: Subject to any disclaimer, the term of this patent is extended or adjusted under 35 U.S.C. 154(b) by 817 days.

(21) Appl. No.: 13/421,075

(22) Filed: Mar. 15, 2012

(65) Prior Publication Data

US 2013/0239357 A1 Sep. 19, 2013

(51) Int. Cl.
| | |
|---|---|
| *A47L 5/00* | (2006.01) |
| *A01G 1/12* | (2006.01) |
| *B65H 75/42* | (2006.01) |
| *B65H 75/44* | (2006.01) |
| *E01H 1/08* | (2006.01) |

(52) U.S. Cl.
CPC ............... *A01G 1/125* (2013.01); *B65H 75/42* (2013.01); *B65H 75/4476* (2013.01); *E01H 1/08* (2013.01); *B65H 2701/34* (2013.01); *E01H 1/0809* (2013.01); *E01H 1/0836* (2013.01)

(58) Field of Classification Search
CPC ........ A47L 9/0018; A47L 9/26; A01G 1/125; E01H 1/08; B65H 75/4476; B65H 75/42
USPC ................. 15/323, 327.5, 344, 405
See application file for complete search history.

(56) References Cited

U.S. PATENT DOCUMENTS

| | | |
|---|---|---|
| 1,746,246 A | 2/1930 | Elworthy |
| 1,754,162 A | 4/1930 | Colegrove |
| 1,918,713 A | 7/1933 | Ponselle |
| 2,003,147 A | 5/1935 | Holm-Hansen |
| 2,037,668 A | 4/1936 | Smith et al. |
| 2,156,467 A | 5/1939 | Walter |
| 2,291,353 A | 7/1942 | Seyfried |
| 2,321,222 A | 6/1943 | Lofgren |
| 2,418,130 A | 4/1947 | Lofgren |
| 2,693,001 A | 11/1954 | Vance |
| 4,047,299 A | 9/1977 | Bair |
| 4,062,430 A | 12/1977 | Momberg |
| 4,067,526 A | 1/1978 | Storer |
| 4,101,089 A | 7/1978 | Culbertson et al. |
| 4,354,650 A | 10/1982 | Lowder |

(Continued)

OTHER PUBLICATIONS

"Good Vibrations, Easy Rider and Start Me Up," *Wrap it Up-Meteor* © [online]. 2011. [retrieved on Oct. 11, 2011]. Retrieved from the Internet:<URL:http://www.gvpower.com/wrap-it-up/>; 2 pgs.

(Continued)

*Primary Examiner* — David Redding

(74) *Attorney, Agent, or Firm* — Mueting, Raasch & Gebhardt, P.A.

(57) ABSTRACT

A cord retainer and cord wrap system for use with a portable (e.g., handheld) electric blower, and a blower incorporating the same. The system may allow for storage of the cord onboard the blower when the latter is not in use. Embodiments of the invention may utilize a portion of the blower housing to form one winding surface for the cord. A second winding surface may be provided by a cord retainer that may be secured in place along the extension tube of the blower, e.g., via interference fit. Other embodiments may include two or more nozzles that may be selectively inserted into the extension tube to permit selective tuning of blower performance.

18 Claims, 10 Drawing Sheets

(56) References Cited

U.S. PATENT DOCUMENTS

| | | | |
|---|---|---|---|
| 4,658,465 | A | 4/1987 | Keane et al. |
| 4,809,393 | A | 3/1989 | Goodrich et al. |
| 5,014,385 | A | 5/1991 | Bradd et al. |
| 5,513,816 | A | 5/1996 | Grubb |
| 6,003,199 | A | 12/1999 | Shaffer |
| 6,450,436 | B1 | 9/2002 | Tsuji et al. |
| 6,484,348 | B1 | 11/2002 | Paterson et al. |
| 6,510,583 | B2 | 1/2003 | Griffin et al. |
| 6,588,052 | B2 | 7/2003 | Iversen |
| 6,698,560 | B2 | 3/2004 | Reardon et al. |
| 6,942,173 | B1 | 9/2005 | Abramov |
| 7,004,785 | B2 | 2/2006 | Melton et al. |
| 7,735,188 | B2 | 6/2010 | Shaffer |
| 2011/0220754 | A1 | 9/2011 | Merten et al. |

OTHER PUBLICATIONS

"Set of 2 on Board Cord Storage Hooks," *Whatever Works Garden Home Pest Control*, [online]. [retrieved on Sep. 26, 2011]. Retrieved from the Internet: <URL:http://www.whateverworks.com/itemdy00.asp?ID=4,331&GEN1=Out . . . >; 1 pg.

"Cord Storage Hooks," *Lee Valley & Veritas*, [online]. 2011. [retrieved on Sep. 26, 2011]. Retrieved from the Internet:<URL: http://www.leevalley.com/en/wood/page.aspx?cat=1,43456,43460&p=65679 >; 1 pg.

Johnson, "Store the Extra Cord on Your Yard Tools," *Toolmonger*, Jul. 2010. [online]. Jul. 26, 2010. [retrieved on Jun. 15, 2012]. Retrieved from the Internet: <URL:http://toolmonger.com/2010/07/26/store-the-extra-cord-on-your-yard-tools/#more-41494> 3 pgs.

"Cord Storage Hooks," *Utility Journal*, [online]. [retrieved on Sep. 27, 2011]. Retrieved from the Internet:<URL:http://www.utilityjournal.com/cord-storage-hooks>; 2 pgs.

CORD WRAP SYSTEM AND PORTABLE BLOWER INCORPORATING SAME

Embodiments of the present invention relate generally to portable (e.g., handheld) debris blowers and, more particularly, to apparatus, systems, and methods for permitting an elongate electrical power cord to be secured to, and stored onboard, the blower.

BACKGROUND

Debris blowers are commonly used by homeowners and professionals alike for the removal of debris from yards, driveways, sidewalks, etc. Often, such devices may be configured as either a blower or a vacuum and are, for this reason, sometimes referred to as "blower/vacs." As used herein, the term "blower" is understood to include both dedicated blowers as well as blower/vacs.

When used in the blower configuration, debris blowers provide a sweeping action created by the production of a fast moving stream of air generated by a rotating impeller located within a blower housing. The air stream is typically channeled through a tapered, removable extension tube. In addition to providing a narrowly focused air stream, the tapered extension tube may also contribute to an air stream of greater velocity. Alternatively, when used in the vacuum configuration, vacuum attachments coupled to an air inlet of the housing permit leaves or similar debris to be vacuumed into a bag or other debris container attached to an air outlet of the housing.

Because many blowers are designed for hand-held use, they are often made of lightweight materials and utilize lightweight power sources, e.g., small electric motors. While the motors may be battery powered, many blowers include an electrical plug designed to connect with a conventional electrical power outlet (e.g., a 120 volt (60 Hertz), 15 amp circuit) via an extension cord. The cord may be of a length appropriate (e.g., 15 feet to 25 feet or more) to provide the desired radius of operation from the power outlet.

When not in use, the cord is generally unplugged and stored separately from the blower. When subsequently used, the operator must find and re-attach the cord before blower operation may begin.

SUMMARY

The present invention may overcome these and other issues with known blower configurations. For example, in one embodiment of the present invention, a handheld blower is provided that includes a housing, wherein a portion of the housing comprises a first cord winding surface. An extension tube may also be provided and includes a first end configured to removably attach to an air outlet of the housing. A second end of the extension tube may be positioned distal to the housing when the first end is attached to the air outlet. The extension tube further includes an outer surface having a cross section that tapers from a first dimension near the first end, to a second dimension near the second end, the second dimension being smaller than the first dimension. The blower may also include a cord retainer located along the extension tube, wherein the cord retainer forms a second cord winding surface, the first and second cord winding surfaces configured to receive windings of an elongate cord.

In another embodiment, a portable blower is provided that includes a housing defining an air outlet, wherein a portion of the housing includes a first cord winding surface. The blower further includes an extension tube configured to removably attach to the housing at the air outlet, wherein the extension tube has an upstream end having a first external dimension in cross section, and a downstream end having a second external dimension in cross section that is smaller than the first external dimension. The blower may further include a cord retainer configured to attach to the extension tube, wherein the cord retainer has a sleeve defined by an internal cross sectional dimension that is intermediate the first and second external dimensions of the extension tube. The sleeve may be configured to slide over the downstream end of the extension tube and toward the upstream end until it reaches a retainer location defined by an interference fit relationship between the sleeve and the extension tube. The cord retainer may include a second cord winding surface, wherein the first and second cord winding surfaces are configured to receive and support windings of an elongate cord.

In yet another embodiment, a portable blower is provided that includes a housing defining an air outlet and a tapered extension tube configured to attach to the housing at the air outlet. The extension tube includes an upstream end having a first external dimension in cross section, and a downstream end having a second external dimension in cross section that is smaller than the first external dimension. A cord retainer is also included and is configured to attach to the extension tube. The cord retainer includes a sleeve defined by an internal surface that corresponds in size and shape to at least a portion of an external surface of the extension tube when the retainer is located at a retainer location along the extension tube between the upstream and downstream ends. Thus, when the sleeve is slid over the downstream end of the extension tube and toward the upstream end, it is configured to slide until it reaches the retainer location.

In still another embodiment, a method for storing an elongate cord with a portable blower is provided, wherein the method includes placing a sleeve of a cord retainer over a downstream end of an extension tube attached to a housing of the blower. The tube includes an external surface that tapers in cross section from an upstream end proximate the housing to the downstream end distal to the housing, the downstream end being smaller than the upstream end. The method further includes: sliding the cord retainer towards the upstream end of the extension tube until the sleeve reaches a position wherein an internal surface of the sleeve engages the external surface of the extension tube with interference; and wrapping an elongate cord about: a first cord winding surface located on the housing of the blower; and a second cord winding surface formed by the cord retainer.

In still another embodiment, a cord retainer is provided and is configured to attach to a portable blower comprising a tapered extension tube. The extension tube includes an upstream end having a first external dimension in cross section, and a downstream end having a second external dimension in cross section that is smaller than the first external dimension. The cord retainer includes a sleeve defined by an internal cross sectional dimension that is intermediate the first and second external dimensions of the extension tube, wherein the sleeve is configured to slide over the downstream end of the extension tube and toward the upstream end until it reaches a retainer location defined by an interference fit relationship between the sleeve and the extension tube. The cord retainer includes a cord winding surface protruding from the sleeve.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein.

Figure 1:
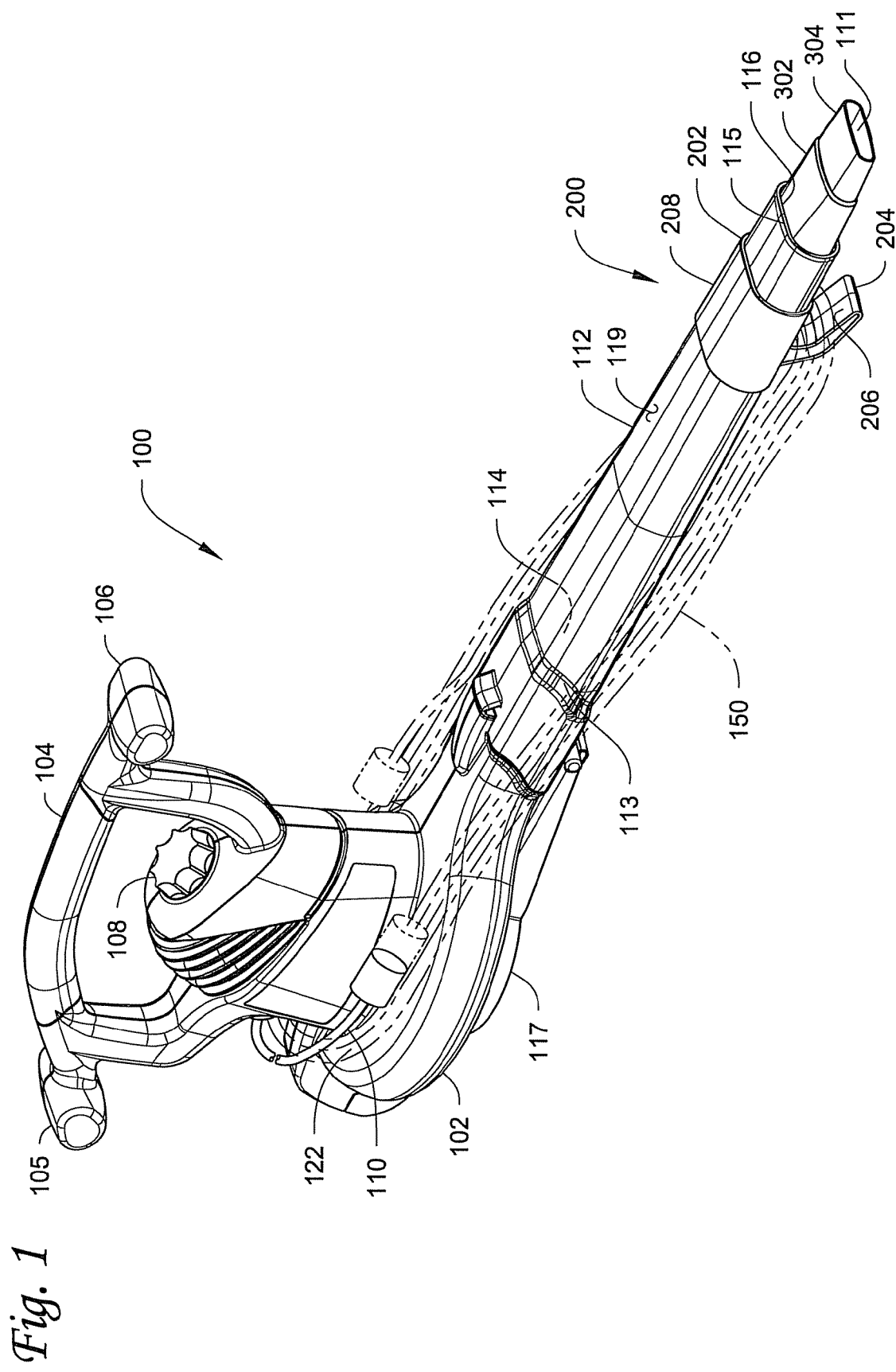
FIG. 1 is an upper front perspective view of a blower incorporating a cord wrap system in accordance with one embodiment of the present invention.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments of the invention. The lack of illustration/description of such structure/components in a particular figure is, however, not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the invention.

Embodiments of the present invention are directed to portable power tools such as electrically powered handheld blower/vacs (which, once again, may be referred to herein simply as "blowers"). Exemplary blowers may receive power from a remotely-located electrical outlet via a conventional extension cord. The blower may include a cord wrap system that permits onboard storage of the cord when the blower is not in use.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as left, right, front, forward, rear, rearward, top, bottom, side, upper, lower, above, below, horizontal, vertical, and the like may be used herein and, if so, are from the perspective observed in the particular figure, or as observed when the blower is in a generally horizontal orientation (see, e.g., FIGS. 1 and 2). These terms are used only to simplify the description, however, and not to limit the scope of the invention in any way.

With reference to the drawings, wherein like reference numerals designate like parts and assemblies throughout the several views, FIG. 1 illustrates a perspective view of a portable, electric blower 100 in accordance with one embodiment of the invention. While described herein with application to convertible blower/vacuum units, embodiments of the present invention are equally applicable to units configurable as blower-only or even vacuum-only machines. Moreover, those skilled in the art will appreciate that other types of corded power equipment could also benefit from the concepts described and/or illustrated herein.

While not necessarily central to an understanding of embodiments of the present invention, construction and operation of an exemplary blower will now be described. For additional information regarding an exemplary blower/vacuum and components of the same, see U.S. Pat. No. 7,735,188 to Shaffer, incorporated by reference herein in its entirety.

Figure 9:
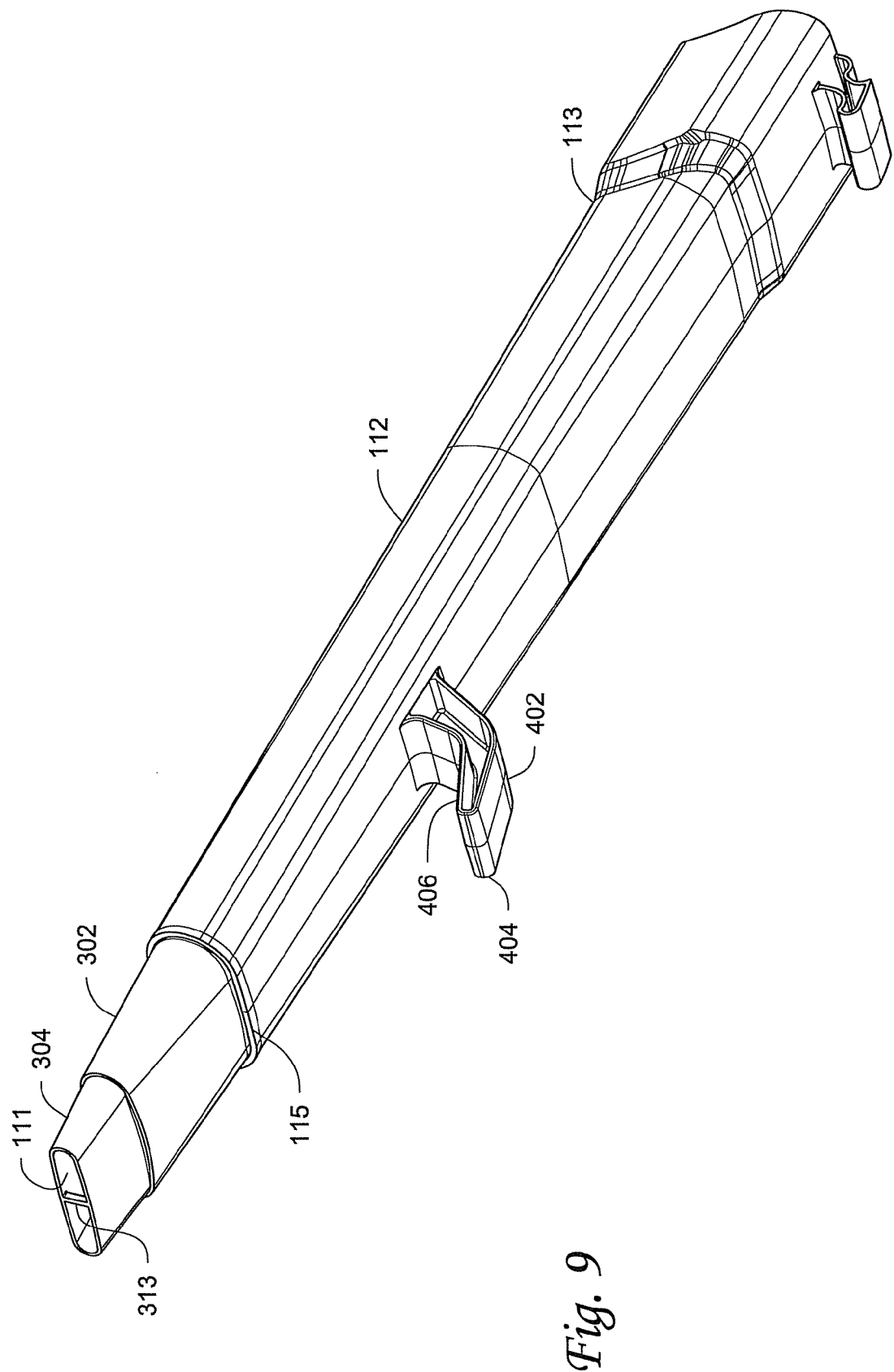
FIG. 9 is a bottom perspective view of an extension tube with a cord retainer in accordance with another embodiment of the present invention.

The exemplary blower 100 may be configured to operate in either a blower mode (see, e.g., FIGS. 1-3) or a vacuum mode (not shown herein, but see, e.g., FIG. 9 of the '188 patent). As shown in FIG. 1, the blower 100 may include a housing 102 having one or more handles 104, 105, and 106 adapted to receive hands of an operator during use. The housing 102 may further include an integral, short power cord 110 for connecting to external AC power. In the illustrated embodiment, the cord 110 may form a male portion of a conventional 120V/60 Hz electrical plug.

To selectively control delivery of electrical power to a motor (not shown) located within the housing, a switch 108 may also be provided. In one embodiment, the switch 108 is coupled, e.g., in series, between the power cord 110 and the motor. The switch 108 may merely open or close a power delivery circuit or, alternatively, rheostatically vary the power to the motor to provide adjustable motor speed.

When operating in the blower mode as shown in FIG. 1, the blower 100 preferably includes an extension tube 112 having a proximal (e.g., first) or upstream end 113 configured to removably attach to an air outlet 114 of the housing 102. For example, the upstream end 113 of the extension tube 112 may form a female portion that slides over a tubular male portion formed by the air outlet 114 (see also FIG. 4).

Figure 6:
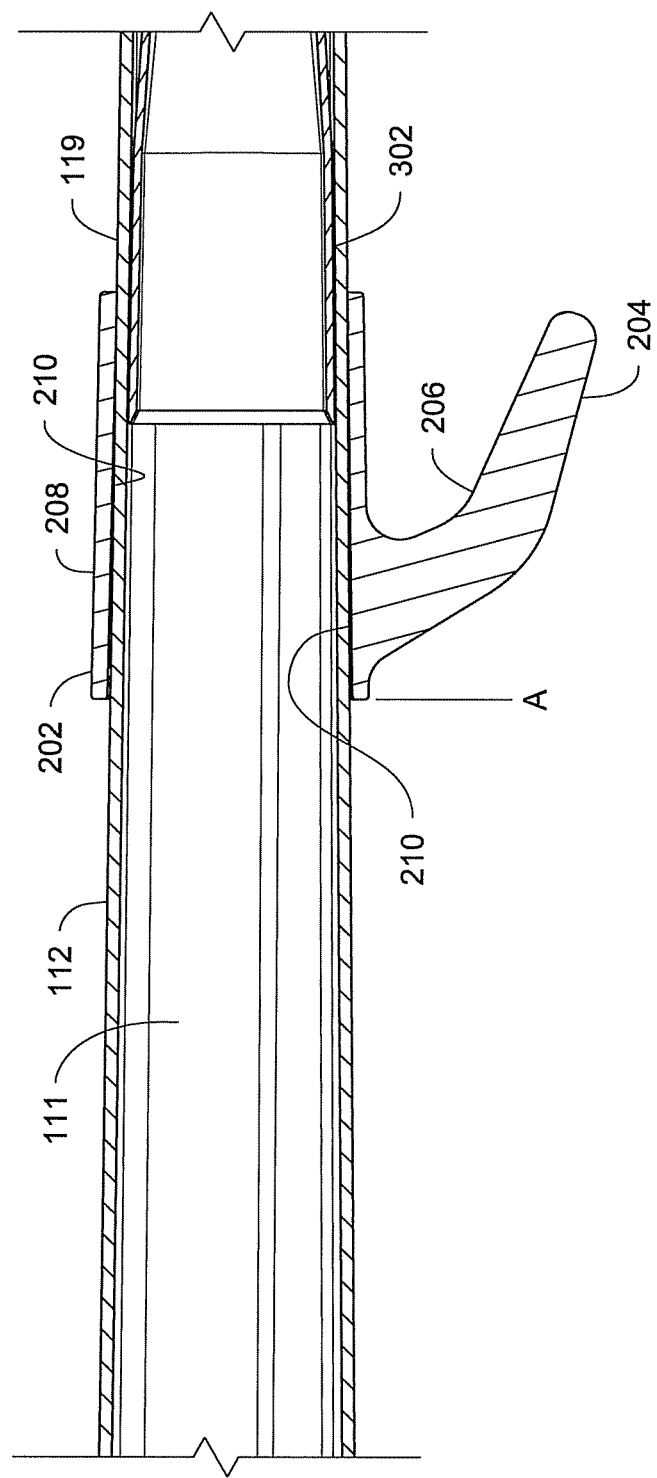
FIG. 6 is a section view of a portion of the extension tube and cord retainer taken along line 6-6 of FIG. 5.

The extension tube 112 may include an outer or external surface 119 that tapers in cross section from a first dimension near the larger upstream end 113 (proximate the housing 102), to a smaller second dimension near a distal (e.g., second) or downstream end 115 (distal the housing), the latter at which is formed an outlet 116 of the tube 112. Stated another way, the upstream end 113 may define a first external dimension in cross section and the downstream end 115 may define a second external dimension in cross section that is smaller than the first external dimension. The extension tube 112 may further define a similarly tapered passageway 111 extending through the tube from the upstream end 113 to the downstream end 115 as indicated in FIGS. 1 and 6. The tapered extension tube 112 permits, among other benefits, focusing of the high velocity air stream produced by the blower 100. The taper may also advantageously accommodate the cord retainer as further described below.

In some embodiments, optional air concentrator nozzles 302, 304—described in more detail below—may also be provided. The nozzles may permit selective reduction of the cross-sectional area of the extension tube outlet 116 to, for example, tune blower output.

In the illustrated embodiment, the housing 102 is formed from mating plastic halves that, when assembled, define an interior cavity. The cavity may enclose the electric motor (not shown) as well as an impeller (also not shown, but see the '188 patent) powered by the motor.

When external electrical power is provided to the motor, the impeller may rotate. As the impeller rotates, curved blades or vanes formed on the impeller may draw air into a scroll or plenum chamber also formed within the housing 102. The air may be drawn into the housing 102 through an air inlet 118 (shown covered by an air inlet cover 117 in FIGS. 1 and 2), where it may be accelerated and exhausted through the air outlet 114 and through the extension tube 112.

Figure 2:
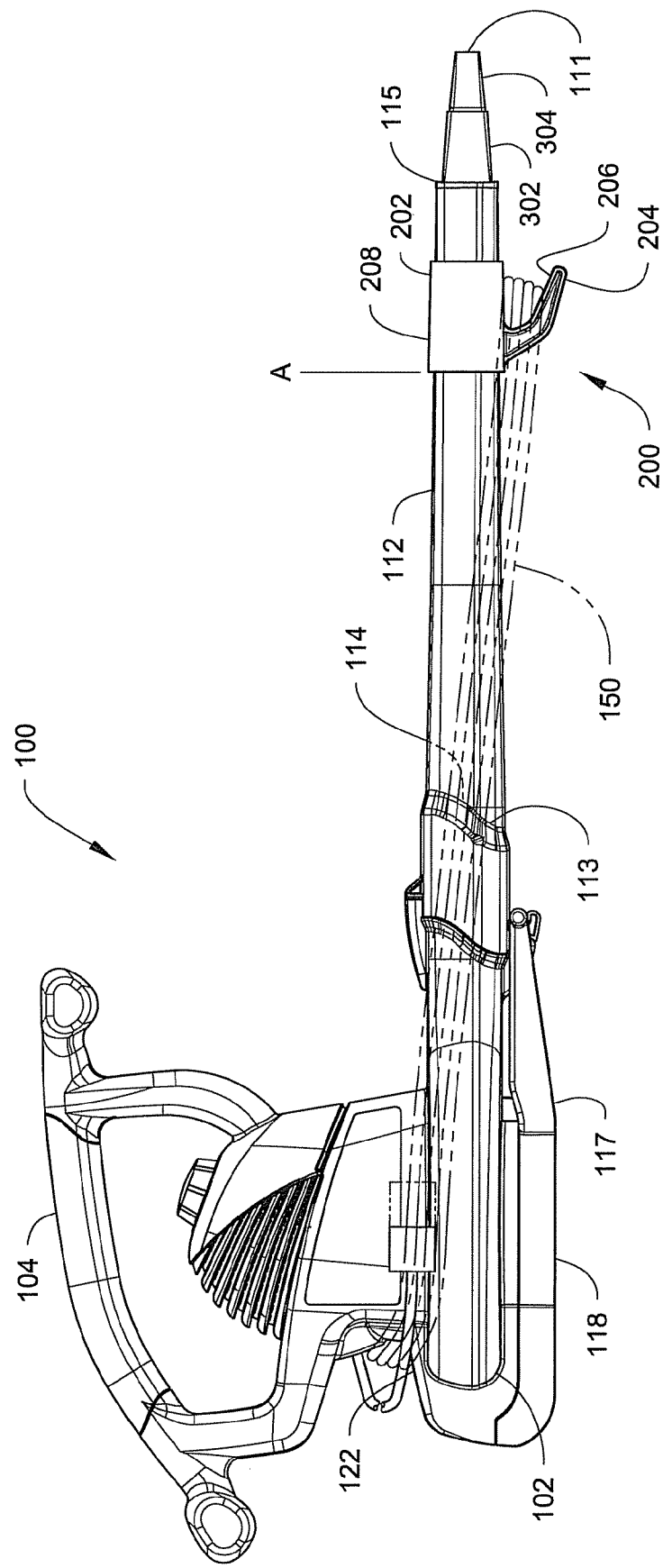
FIG. 2 is a side elevation view of the blower of FIG. 1.
Figure 3:
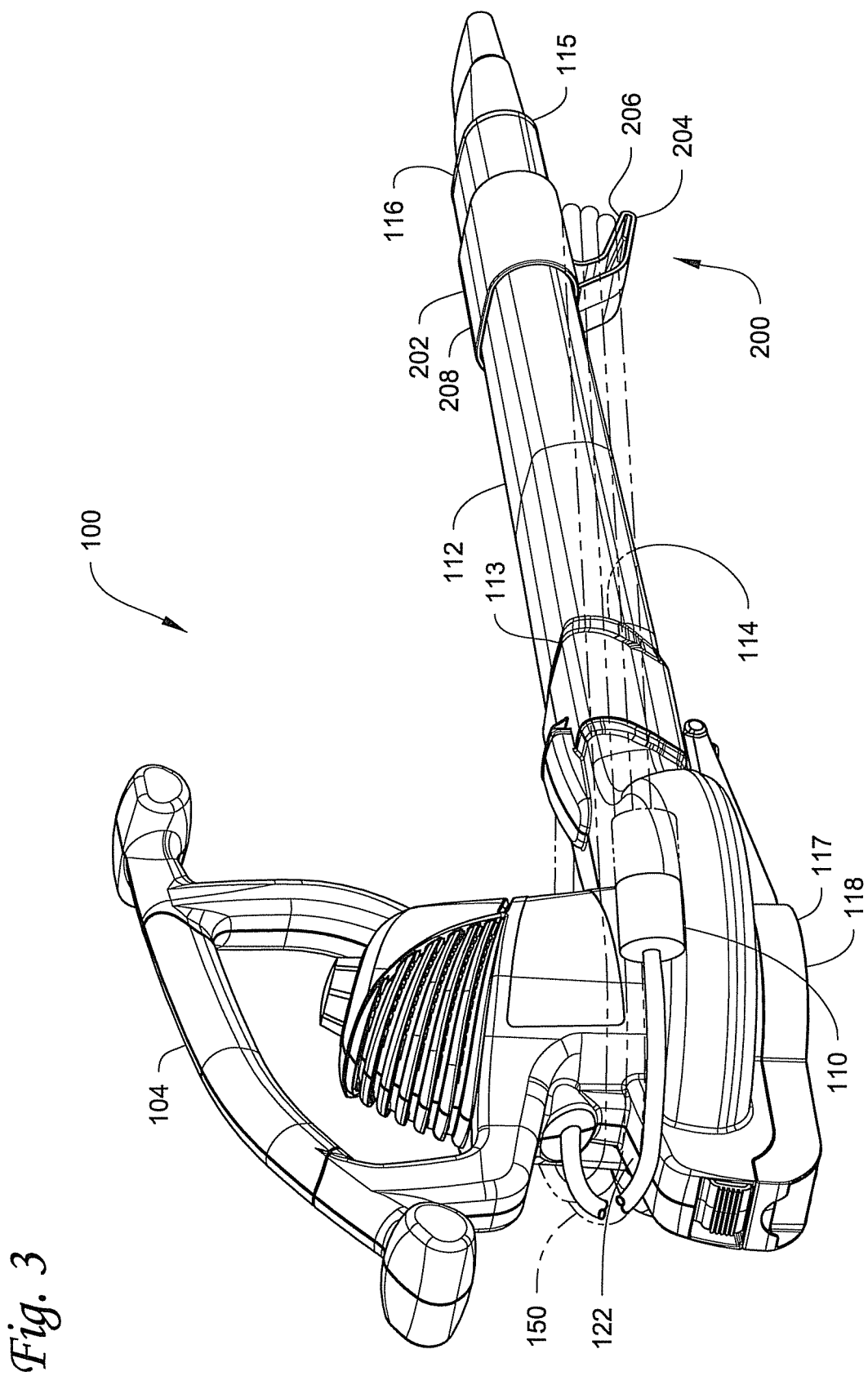
FIG. 3 is an upper rear perspective view of the blower of FIG. 1.

With reference to FIGS. 1-3, the blower 100 may further include a cord wrap system 200 in accordance with embodiments of the present invention. The exemplary system 200 may allow storage of an extension cord 150 onboard the blower when the latter is not being used. In the illustrated embodiment, a portion of the housing 102 may define a first cord winding surface 122 configured to receive the cord 150. More specifically, the first cord winding surface 122 may be formed by a surface (e.g., a ledge or recess) formed on a side (e.g., a rear side) of the housing 102 that is opposite the air outlet 114 and extension tube 112.

The system 200 may further include a cord retainer 202 located along the extension tube and forming a protruding hook 204 that defines a second cord winding surface 206. The first and second cord winding surfaces may be configured to receive and support windings of the cord 150 as shown in FIGS. 1-3. In the illustrated embodiment, the cord retainer 202, as well as the extension tube 112, may be formed from a rigid material such as polypropylene. By providing at least one, and preferably at least two, cord winding surfaces, the cord 150 may be repeatedly wound or wrapped about the blower 100 (about the first cord winding surface 122 of the housing 102 and the second cord winding surface 206 of the cord retainer 202) as shown in FIGS. 1-3 to permit secure onboard storage of the cord when the blower is not in use.

Figure 4:
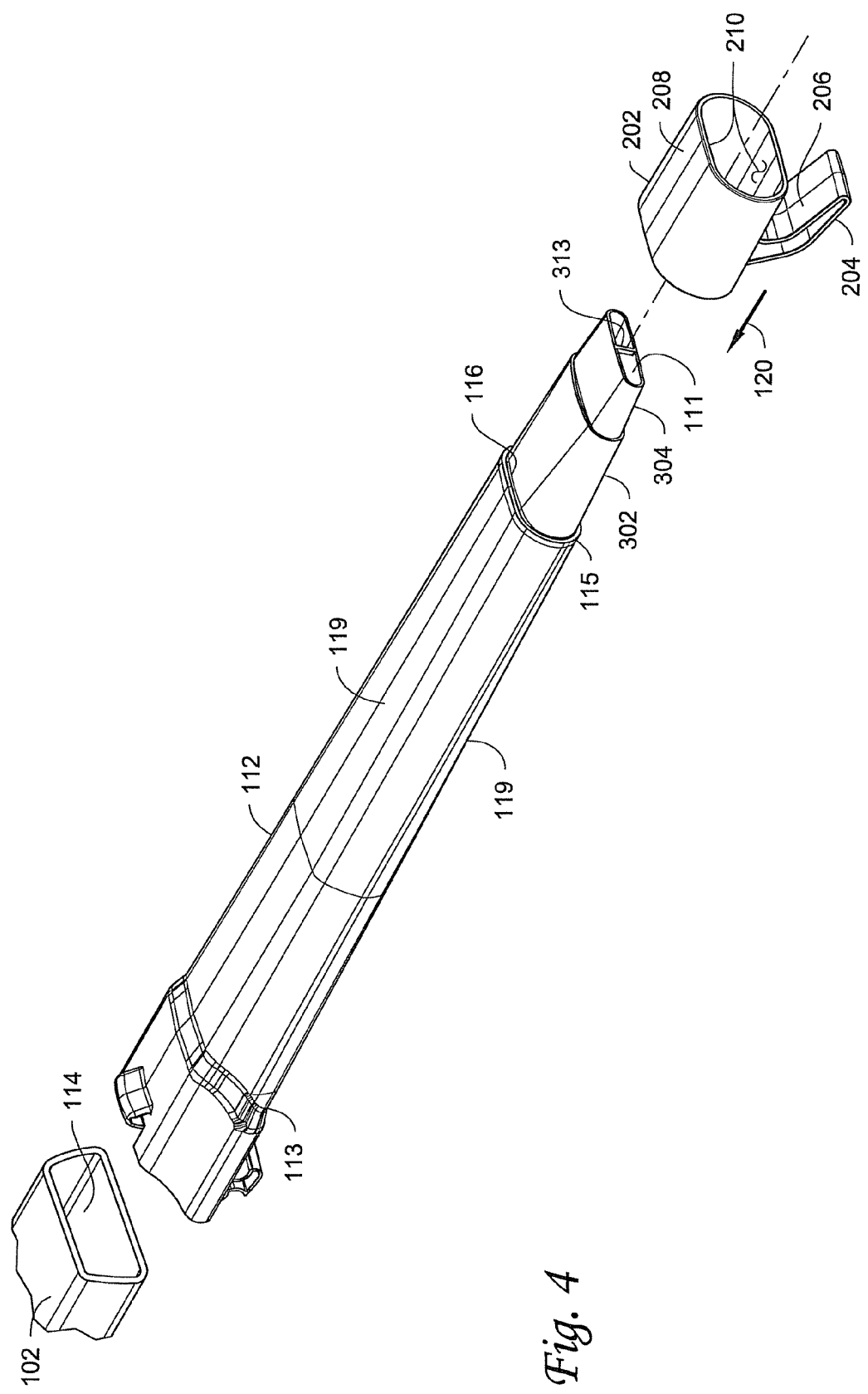
FIG. 4 is an enlarged view of an extension tube and cord retainer in accordance with one embodiment of the invention, the retainer shown prior to attachment to the extension tube.
Figure 5:
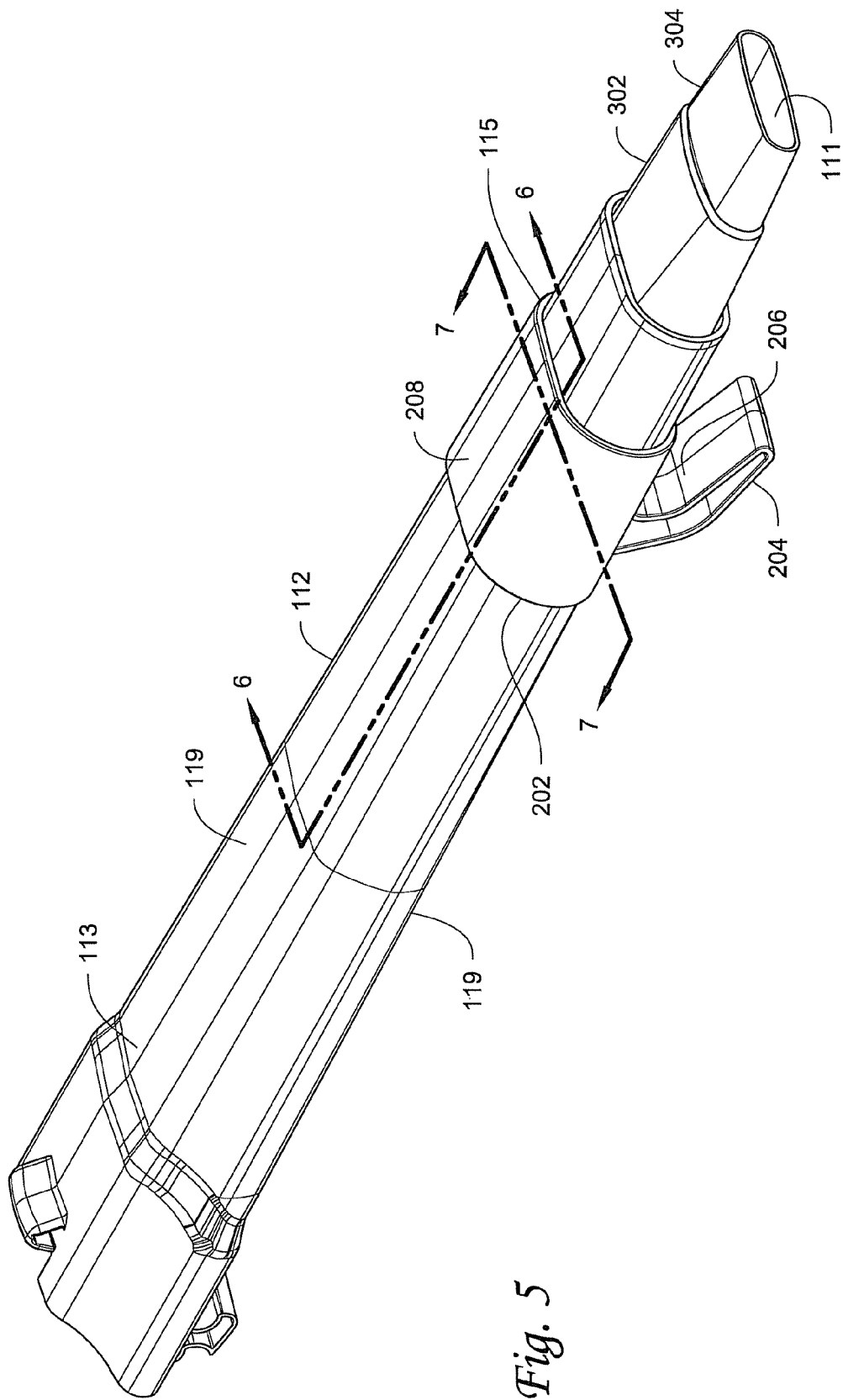
FIG. 5 is an enlarged view of the extension tube and cord retainer of FIG. 4 after attachment of the cord retainer to the extension tube.

In one embodiment, the cord retainer 202 is a separate component as shown in FIG. 4 that is configured to be attached to the extension tube 112, e.g., by the user or by the manufacturer. For instance, the cord retainer 202 may include a sleeve 208 defined by an internal surface 210 having an internal cross sectional dimension that is intermediate the corresponding first and second external cross sectional dimensions (of the upstream end 113 and the downstream end 115, respectively) of the extension tube 112. Thus, when the sleeve 208 is slid over the downstream end 115 of the extension tube 112 and toward the upstream end 113 as indicated by the arrow 120 in FIG. 4, it may slide until it reaches a retainer location "A" (see FIG. 2) defined by an interference fit relationship between portions of the internal surface 210 of the sleeve and portions of the external surface 119 of the extension tube as shown in FIG. 5.

In the illustrated embodiment, the internal surface 210 (see FIG. 4) of the sleeve 208 may also be tapered. That is, the internal surface 210 of the sleeve 208 may have a taper similar to that of the corresponding external surface 119 of the extension tube 112 when the retainer 202 is located at the retainer location A. Thus, when the sleeve is slid over the downstream end 115 of the extension tube 112 and toward the upstream end 113, it may slide until it reaches the retainer location A (see FIG. 2). While the retainer location A is illustrated as the location of the upstream end of the sleeve 208 of the cord retainer 202, this is for illustration purposes only as the retainer location A may be indexed by any portion of the cord retainer relative to the extension tube.

Although the retainer 202 may be secured in place merely by an interference fit with the tube 112, other embodiments may provide alternative or additional retaining features. For instance, either the sleeve 208 or the tube 112 may include a protrusion that engages a corresponding depression in the other member to provide a distinct detent or snap fit.

In the illustrated embodiment, the retainer location A is selected to place the second cord winding surface 206 near the downstream end 115 of the extension tube 112. Such a configuration may provide a greater distance between the first cord winding surface 122 of the housing 102 and the second cord winding surface. By making this distance relatively large, the number of times a length of cord 150 must be wrapped may be minimized. However, the specific retainer location A is not limiting as other embodiments wherein the retainer location A may be at most any position along the extension tube 112 are also contemplated.

Figure 7:
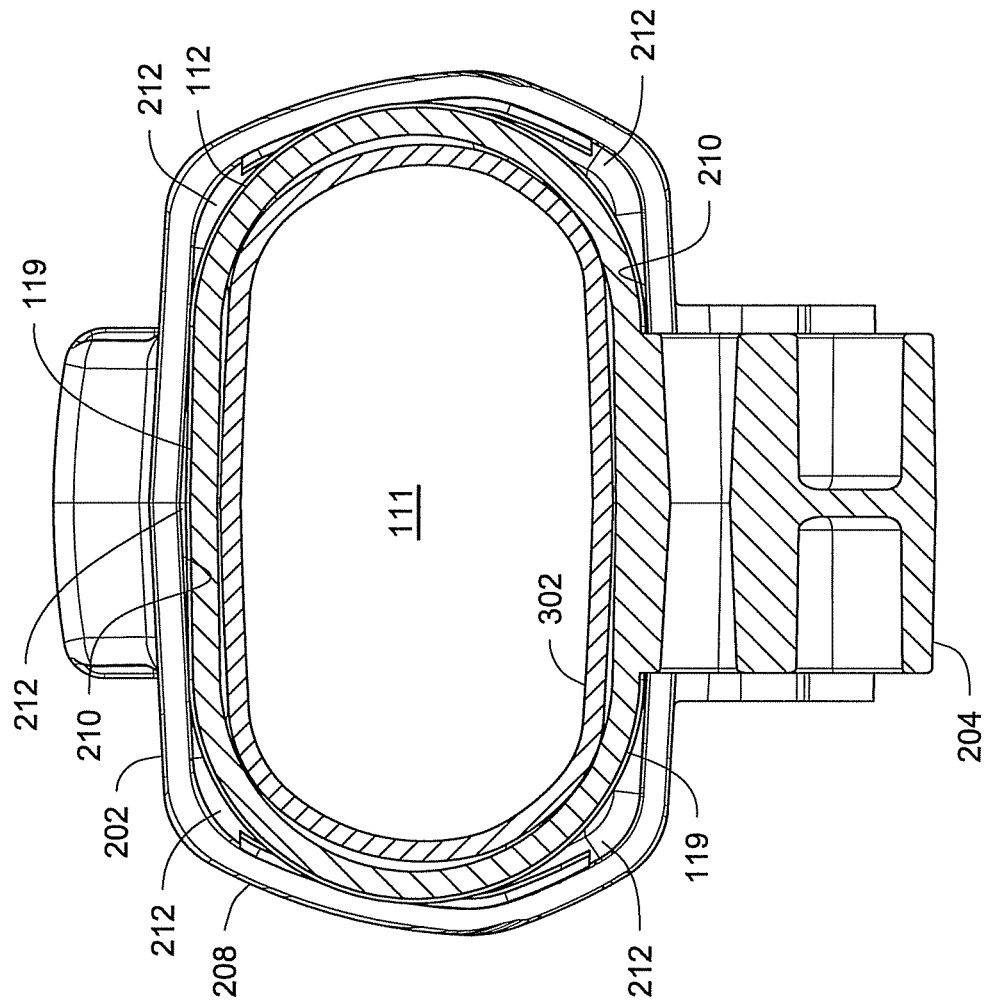
FIG. 7 is another section view of the extension tube and cord retainer taken along line 7-7 of FIG. 5.

FIG. 5 is a perspective view of the exemplary extension tube 112 separated from the housing 102, while FIGS. 6 and 7 are section views of the extension tube taken along lines 6-6 and 7-7 of FIG. 5, respectively. In these views, the cord retainer 202 is shown installed on the extension tube 112 at retainer location A. Once again, as shown in FIG. 6, the internal surface 210 (at least the upper and lower portions of the internal surface) of the sleeve 208 may have an overall size, shape, and/or taper angle that generally matches, or corresponds to, the overall size, shape, and/or taper angle of corresponding portions of the external surface 119 of the extension tube 112 (at least when the retainer 202 is positioned at retainer location A).

That being said, the internal cross sectional shape of the sleeve 208 (e.g., the shape of the internal surface 210) is not necessarily identical to the external cross sectional shape of the extension tube 112. For instance, as shown in FIG. 7, there may be gaps 212 between the sleeve 208 and the tube 112 even when the sleeve is in the retainer location A as shown. Such gaps may allow relative sliding of the sleeve 208 over the tube 112 without excessive binding. However, the configuration of the internal surface 210 of the sleeve 208 and the constantly increasing taper of the extension tube 112 ensures that some portion of the internal surface 210 will ultimately engage a corresponding portion of the external surface 119 of the extension tube (e.g., when the retainer reaches the retainer location A).

By providing a sleeve 208 with an internal surface 210 sized in this manner, the cord retainer 202 may be, to some degree, universal in that it may be utilized with extension tubes of varying size and cross sectional configuration. In fact, the same retainer 202 could be used with most any extension tube that tapers from a downstream end (e.g., an end 115 of a size receivable within the retainer sleeve), to a larger upstream end (e.g., end 113). Such a configuration may allow the sleeve, when slid over the downstream end, to slide until it engages the external surface of the extension tube with interference at a location between the downstream and upstream ends. As a result, a single cord retainer, in addition to its inclusion as original equipment with specific blower models, could also be provided as an accessory for use with a variety of other extension tubes/blowers (e.g., those from other manufacturers).

To install the cord retainer 202, the sleeve 208 may be slid over the downstream end 115 of the extension tube (see FIG. 4) and toward the upstream end 113 until the sleeve reaches the retainer location A (see FIGS. 2 and 6). At this point, the internal surface 210 of the sleeve engages the external surface 119 of the extension tube 112 with interference. Accordingly, the elongate cord 150 (see FIG. 1-3) may be wrapped around the first cord winding surface 122 defined by the housing 102 and the second cord winding surface 206 defined by the cord retainer 202.

Figure 8:
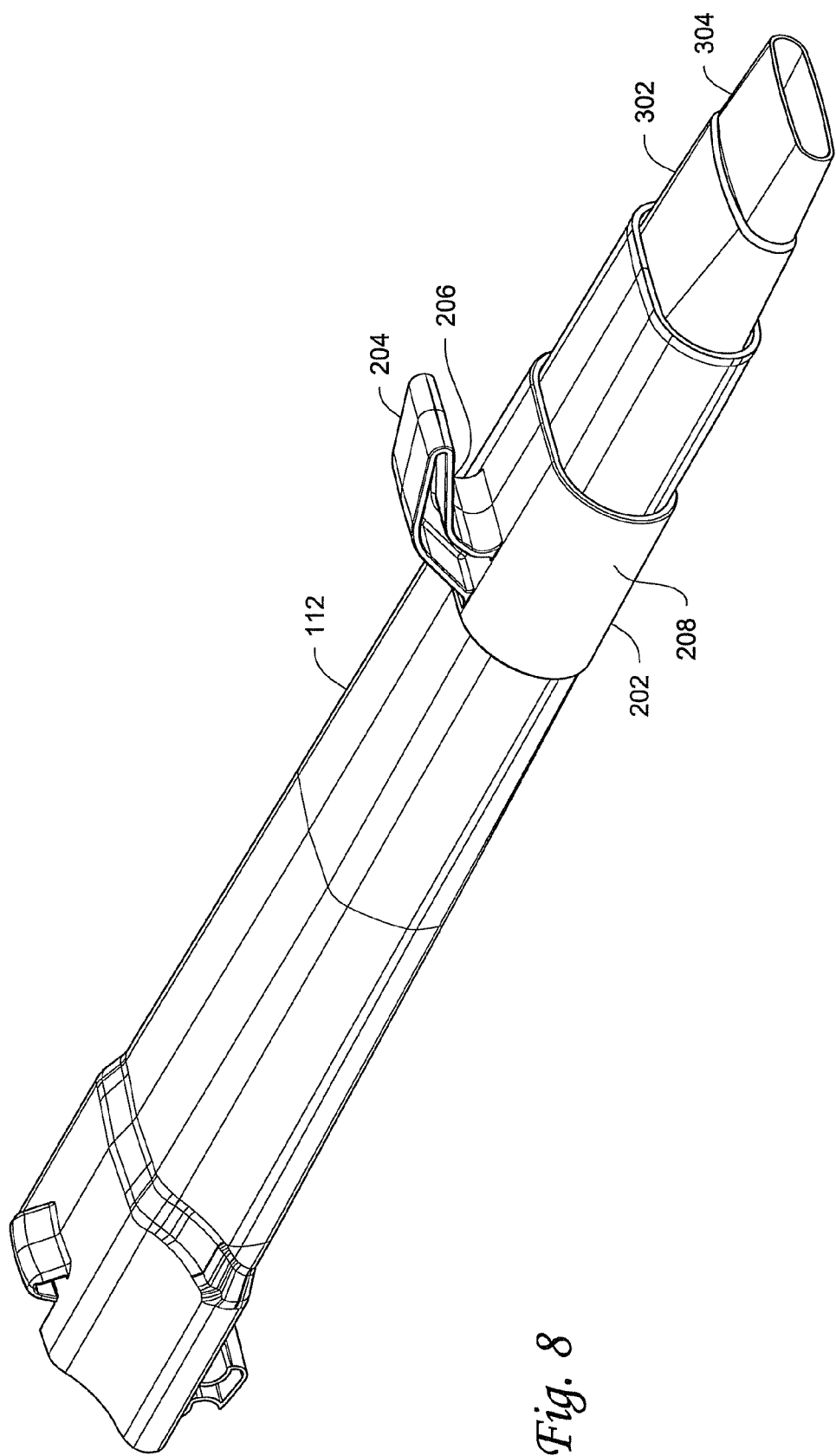
FIG. 8 illustrates an alternative embodiment of the extension tube and cord retainer of FIG. 4.

In some embodiments, the cord retainer 202 may be left in place during blower operation while, in other embodiments, it may be removed at the operator's discretion. Moreover, while shown positioning the hook 204/second cord winding surface 206 of the cord retainer 202 below the tube 112, other embodiments may alter this relationship. For instance, FIG. 8 illustrates an embodiment wherein the cord retainer 202 is inverted from its position shown in FIGS. 1-7, i.e., the hook 204 and second cord winding surface 206 extend upwardly (rather than downwardly) when the extension tube 112 is oriented horizontally (e.g., when the blower is oriented as shown in FIGS. 1 and 2). In yet other embodiments, the hook/second cord winding surface may be located on one of the lateral sides of the tube 112. Regardless of the relative location of the hook 204, the cord 150 may be wrapped about the hook (and the first cord winding surface 122 of the housing) in the same manner already described herein (see, e.g., FIGS. 1-3).

FIG. 9 illustrates an alternative embodiment of the invention wherein a cord retainer 402 is integrally formed with the extension tube 112 at the desired retainer location. As a result, installation/removal of the cord retainer is unnecessary. The cord retainer 402 may again define a hook 404 having a second cord winding surface 406 such that the cord retainer 402 may function in a substantially similar manner to the cord retainer 202 already described herein. Once again, the cord retainer 402 may be located on any side (e.g., top, bottom, or lateral side) of the tube 112 without departing from the scope of the invention.

Figure 10:
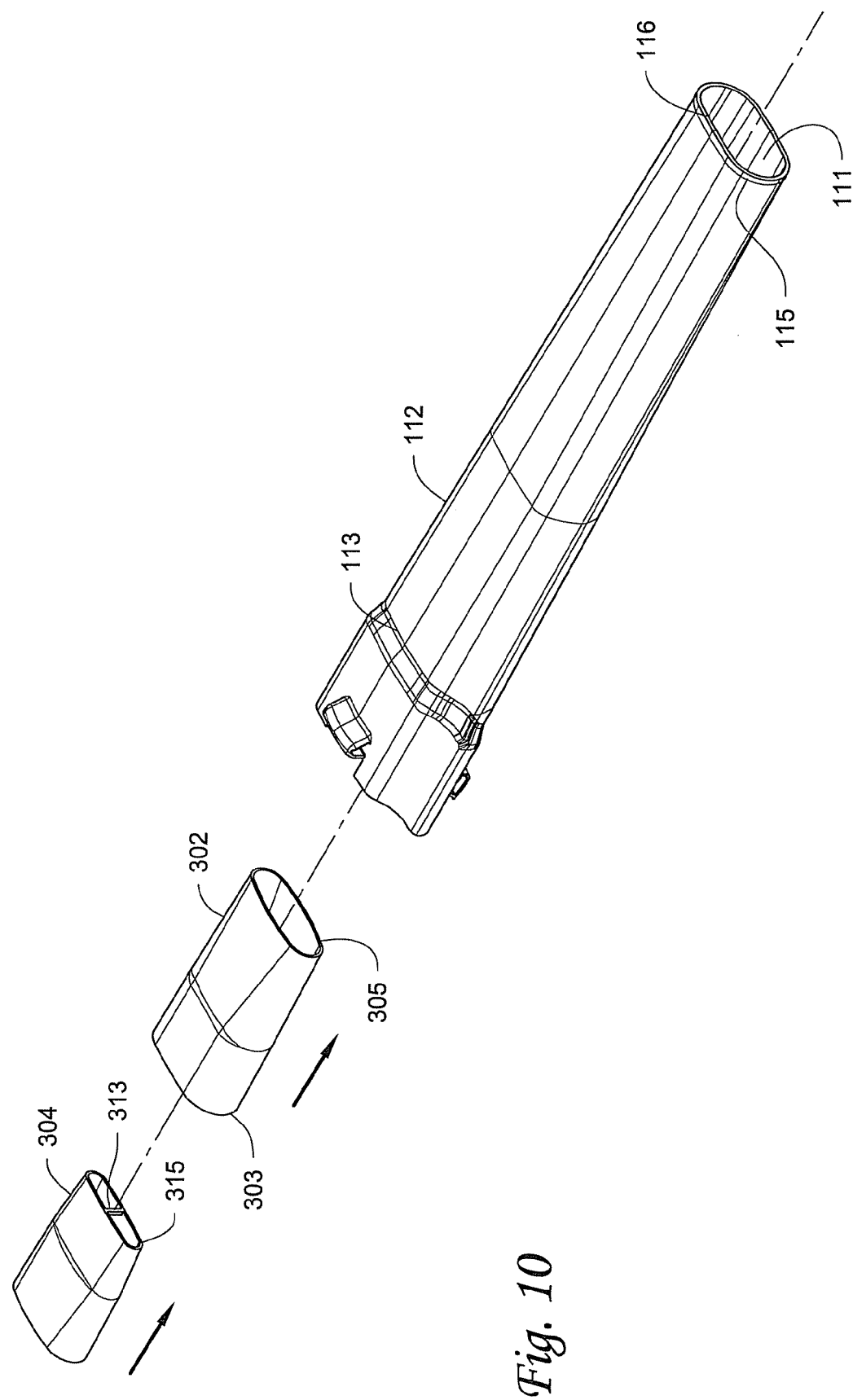
FIG. 10 is an exploded perspective view of the extension tube of FIG. 4 with various exemplary drop-in nozzles shown before insertion into the extension tube.

FIG. 10 illustrates an exploded view of the extension tube 112 in accordance with one embodiment of the invention. As shown in this view, the tube 112 may form an assembly that also includes the two or more drop-in nozzles 302 and 304. Through the use of the nozzles 302, 304 as explained below, the output of the blower may be tuned to achieve particular performance characteristics. For instance, with both of the nozzles 302, 304 removed from the extension tube 112, the extension tube may define an internal first cross sectional area at the outlet 116/downstream end 115. This first cross sectional area may be optimized to deliver a high air flow rate for a given motor current draw. High air flow rate is useful to, for example, clean around bushes and other obstacles.

However, for blower operations that benefit from high air horsepower (e.g., moving piles of debris), the nozzle 302 alone may be inserted into or otherwise attached to the extension tube. A downstream end 305 of the nozzle 302 may define an internal second cross sectional area less than the first cross sectional area of the downstream end 115. As a result, when the nozzle 302 is inserted into the extension tube 112, the cross sectional area of the outlet 116 of the tube is effectively reduced to deliver optimal air horsepower for a given motor current draw. Finally, the nozzle 304 may be inserted into the nozzle 302 after which both nozzles may be simultaneously inserted (e.g., dropped) into the passageway 111 of the extension tube 112 (as shown in, for example, FIG. 4) when the user wishes to maximize blower air speed exiting the tube (e.g., for crevice cleaning). Once again, the end 315 of the nozzle 304 may have an internal third cross sectional area that is less than both the first and second cross sectional areas. As a result, with the nozzle 304 in place, the cross sectional area of the outlet 116 of the extension tube 112 is effectively further reduced to deliver optimal air speed for a given current draw. As shown in FIG. 10, the nozzle 304 may include a rib 313 (see also FIGS. 4 and 9) to, for example, assist in providing dimensional support for the opening at the end 315. As shown herein though (see, e.g., FIGS. 1, 5, and 8), other embodiments of the nozzle 304 may eliminate the rib without departing from the scope of the invention.

In the illustrated embodiments, the nozzles 302, 304 may be inserted into the extension tube 112, whereby they are ultimately frictionally secured in place. For example, to position the nozzle 302, its downstream end 305 may be dropped into the upstream end 113 of the extension tube 112 before the tube is attached to the housing 102. The nozzle 302 may then travel with clearance towards the downstream end 115 of the extension tube 112. When the downstream end 305 of the nozzle 302 protrudes from the downstream end 115 of the tube 112, it may be grasped and pulled outwardly such that the outer surface of the nozzle 302 frictionally engages the inner surface of the extension tube 112. In the illustrated embodiment, a portion of the exterior surface of the nozzle 302 may have a taper that is similar to the taper of the interior surface of the extension tube 112 near the downstream end 115 (see, for example, FIG. 6).

Similarly, to utilize the nozzle 304, its downstream end 315 may be inserted or dropped into the upstream end 303 of the nozzle 302 until the downstream end 315 protrudes from the downstream end 305. At this point, the downstream end 315 may be manually grasped and pulled outwardly from the downstream end 315 of the nozzle 302 until an outer surface of the nozzle 304 engages the inner surface of the nozzle 302 with interference. At this point, the combined nozzles 302, 304 may be dropped, downstream ends 305/315 first, into the upstream end 113 of the tube 112. The nozzles 302, 304 may then travel or fall to the downstream end 115 of the tube 112, where the nozzles may be manually grasped and pulled outwardly from the downstream end 115 until adequately secured in place via frictional engagement with the tube 112. The extension tube 112 may then be re-attached to the housing 102 for blower operation.

When the operator wishes to remove the nozzles 302, 304, the extension tube may be removed from the housing and the nozzles pushed inwardly through the downstream end 115 of the tube 112 until they dislodge and move toward the upstream end 113, at which point they may be removed.

In one embodiment, the blower may include features that permit onboard storage of the nozzles. For example, a side of the cord retainer 202 opposite the hook 204 may include deflectable arms or the like that permit snap-fit reception of the nozzles 302, 304 when the nozzles are not in use. Alternatively, such nozzle receivers may be provided on other portions of the blower, e.g., on the housing or on other portions of the extension tube.

Embodiments of the present invention may provide a cord wrap system that permits an extension cord to be stored on an electric blower (or other power tool) when the blower is not in use. Moreover, the wrap system may utilize a portion of the blower housing to provide at least one of the cord winding surfaces. As a result, a simplified cord retainer (providing only a single cord winding surface) may be sufficient to securely store the cord. Moreover, exemplary cord retainers may take advantage of the existing taper of the extension tube to securely lock in place along the blower tube, eliminating the need for fasteners or tools to hold the retainer in place.

Still further, once the cord is secured to the cord retainer, tension in the cord ensures that the cord retainer remains in place. Other embodiments of the present invention may also provide two or more nozzles utilized with the extension tube of the blower to tune blower performance characteristics.

Illustrative embodiments of this invention are described and reference has been made to possible variations within the scope of this invention. These and other variations, combinations, and modifications of the invention will be apparent to those skilled in the art without departing from the scope of the invention, and it should be understood that this invention is not limited to the illustrative embodiments set forth herein. Rather, the invention is limited only by the claims below, and equivalents thereof.

What is claimed is:

1. A portable blower comprising:
    a housing defining an air outlet, wherein a portion of the housing comprises a first cord winding surface;
    an extension tube configured to removably attach to the housing at the air outlet, the extension tube comprising an upstream end having a first external dimension in cross section, and a downstream end having a second external dimension in cross section that is smaller than the first external dimension; and
    a cord retainer configured to attach to the extension tube, the cord retainer comprising a sleeve formed from a rigid material, the sleeve defined by an internal cross sectional dimension that is intermediate the first and second external dimensions of the extension tube, wherein the sleeve is configured to slide over the downstream end of the extension tube and toward the upstream end until it reaches a retainer location defined by an interference fit relationship between the sleeve and the extension tube, the cord retainer comprising a second cord winding surface, wherein the first and second cord winding surfaces are configured to receive and support windings of an elongate cord.

2. The blower of claim 1, wherein the sleeve comprises an internal surface having a shape that corresponds to a shape of an external surface of the extension tube when the retainer is positioned at the retainer location.

3. The blower of claim 1, wherein the first cord winding surface is defined by a surface formed on a side of the housing that is opposite the air outlet.

4. The blower of claim 1, wherein the second cord winding surface is defined by a hook protruding from the sleeve.

5. The blower of claim 4, wherein the hook extends upwardly when the extension tube is oriented horizontally.

6. The blower of claim 4, wherein the hook extends downwardly when the extension tube is oriented horizontally.

7. The blower of claim 1, wherein the retainer location is configured to place the second cord winding surface near the downstream end of the extension tube.

8. A portable blower comprising:
    a housing defining an air outlet;
    a tapered extension tube configured to attach to the housing at the air outlet, the extension tube comprising an upstream end having a first external dimension in cross section, and a downstream end having a second external dimension in cross section that is smaller than the first external dimension; and
    a cord retainer configured to attach to the extension tube, the cord retainer comprising a sleeve formed from a rigid material, wherein the sleeve is defined by an internal surface that corresponds in size and shape to at least a portion of an external surface of the extension tube at a retainer location along the extension tube between the upstream and downstream ends, and wherein the sleeve, when slid over the downstream end of the extension tube and toward the upstream end, is configured to slide until it reaches the retainer location.

9. The blower of claim 8, wherein the housing comprises a first cord winding surface and the cord retainer comprises a second cord winding surface, the first and second cord winding surfaces configured to permit wrapping of an elongate cord thereabout.

10. The blower of claim 8, further comprising two or more nozzles that may both be simultaneously attachable to the extension tube to change a performance characteristic of the blower.

11. The blower of claim 10, wherein the two or more nozzles may be inserted into one another and into a passageway of the extension tube.

12. A method for storing an elongate cord with a portable blower, the method comprising:
    placing a sleeve of a cord retainer over a downstream end of an extension tube attached to a housing of the blower, the sleeve formed from a rigid material, the tube comprising an external surface that tapers in cross section from an upstream end proximate the housing to the downstream end distal to the housing, wherein the downstream end is smaller than the upstream end;
    sliding the cord retainer towards the upstream end of the extension tube until the sleeve reaches a position wherein an internal surface of the sleeve engages the external surface of the extension tube with interference; and
    wrapping an elongate cord about: a first cord winding surface located on the housing of the blower; and a second cord winding surface formed by the cord retainer.

13. The method of claim 12, further comprising removing the cord retainer from the extension tube when the elongate cord is removed from the first and second cord winding surfaces.

14. The method of claim 12, further comprising positioning the second cord winding surface to extend downwardly from the extension tube when the extension tube is oriented horizontally.

15. The method of claim 12, further comprising positioning the second cord winding surface to extend upwardly from the extension tube when the extension tube is oriented horizontally.

16. A cord retainer configured to attach to a portable blower comprising a tapered extension tube, the extension tube comprising an upstream end having a first external dimension in cross section, and a downstream end having a second external dimension in cross section that is smaller than the first external dimension, the cord retainer comprising a sleeve formed from a rigid material and defined by an internal cross sectional dimension that is intermediate the first and second external dimensions of the extension tube, wherein the sleeve is configured to slide over the downstream end of the extension tube and toward the upstream end until it reaches a retainer location defined by an interference fit relationship between the sleeve and the extension tube, the cord retainer comprising a cord winding surface protruding from the sleeve.

17. The retainer of claim 16, wherein the cord winding surface is configured to receive and support windings of an elongate cord.

18. The retainer of claim 16, wherein the sleeve comprises a tapered internal surface.

\* \* \* \* \*